United States Patent [19]

Harrison

[11] Patent Number: 5,858,069

[45] Date of Patent: Jan. 12, 1999

[54] TREATMENT OF LIQUID

[75] Inventor: Stephen B. Harrison, London, England

[73] Assignee: The BOC Group plc, Windlesham, England

[21] Appl. No.: 896,191

[22] Filed: Jul. 17, 1997

[30] Foreign Application Priority Data

Jul. 19, 1996 [GB] United Kingdom ............... 9615159

[51] Int. Cl.⁶ ............................................. B01D 19/04
[52] U.S. Cl. ........................... 95/154; 95/241; 95/263
[58] Field of Search ........................ 95/241, 242, 253, 95/263, 154; 96/181, 155, 202, 176

[56] References Cited

U.S. PATENT DOCUMENTS

| 2,431,455 | 11/1947 | Blanding | 95/154 |
| 4,426,210 | 1/1984 | Drawert et al. | 95/154 |
| 4,613,347 | 9/1986 | Ranchert et al. | 95/265 |
| 4,720,290 | 1/1988 | McCoy | 95/154 |
| 5,039,319 | 8/1991 | Glass et al. | 95/154 |
| 5,279,963 | 1/1994 | Hobby | 55/228 |
| 5,378,264 | 1/1995 | Wei et al. | 95/154 |
| 5,423,901 | 6/1995 | Mendoza | 95/154 |
| 5,558,768 | 9/1996 | Ikura et al. | 95/154 |
| 5,683,587 | 11/1997 | Ferrara et al. | 95/236 |

FOREIGN PATENT DOCUMENTS

| 48-17470 | 3/1973 | Japan | 95/154 |
| 58-87416 | 7/1981 | Japan | 95/154 |
| 1 455 567 | 1/1973 | United Kingdom . | |
| 2277889 | 11/1994 | United Kingdom | 95/154 |

OTHER PUBLICATIONS

"Oxygen Transfer in Activated Sludge Basins of Sewage Treatment Plants", H. H. Daucher, Ger. Chem. Eng., vol. 1, pp. 282–289 (1978).

Primary Examiner—Duane S. Smith
Attorney, Agent, or Firm—David A. Draegert; Salvatore P. Pace

[57] ABSTRACT

There is described an improvement in a process of dispersing/dissolving a gas in a body of aqueous liquid by dispersing/dissolving the gas in a stream of the liquid and introducing the stream into the body of liquid comprising introducing a quantity of non-ionic surfactant, anionic surfactant or mixtures thereof into the liquid thereby inhibiting coalescence of gas bubbles and enhancing dispersion/dissolution.

20 Claims, 3 Drawing Sheets

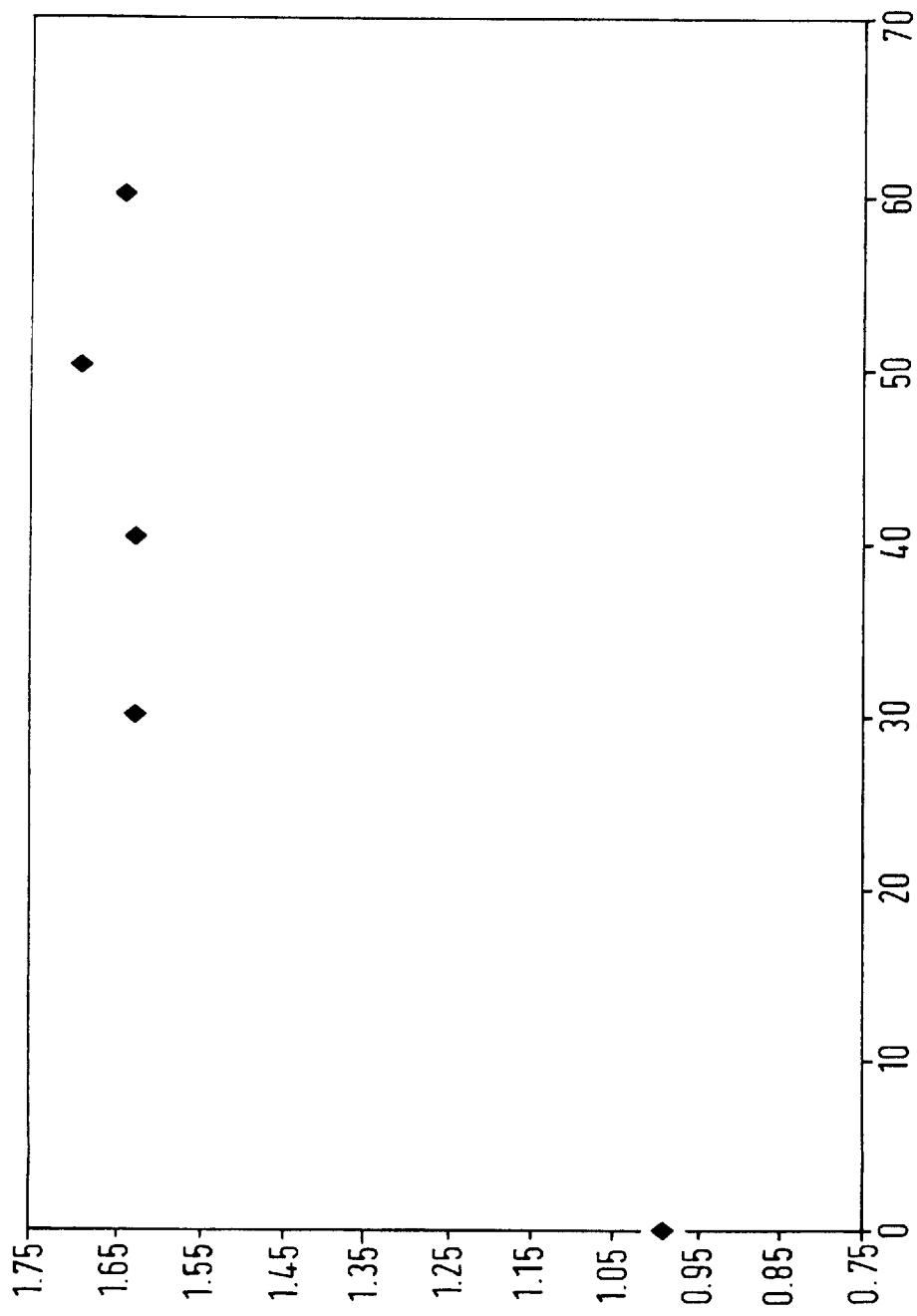

TREATMENT OF LIQUID

The present invention relates to a method of treating a liquid and relates particularly, but not exclusively, to a method of dispersing and/or dissolving oxygen in an aqueous liquid.

BACKGROUND OF THE INVENTION

Known methods of oxygenating sewage or other aqueous waste material include that disclosed in GB-A-1 455 567 which discloses a process for treating an aqueous liquid, including the steps of taking a stream of the liquid, pressurizing the stream, introducing a treatment gas into the pressurized stream under turbulent conditions so as to dissolve some of the gas therein, and introducing the stream containing dissolved and undissolved gas through a nozzle into a volume of the liquid such that the undissolved gas enters the volume of liquid in the form of fine bubbles that become widely dispersed within the liquid and dissolve therein. By using this stream as a carrier of gas bubbles, a much greater quantity of gas can be successfully carried by the stream into the main volume of liquid and dissolved therein than if the amount of gas carried in the stream is merely limited to that which can be dissolved in the stream. Nonetheless, there is some loss of efficiency as a result of coalescence of the bubbles, particularly in the main volume of liquid.

Coalescence of bubbles reduces mass transfer from the gas phase to the liquid phase and results in undissolved gas rising to the surface of the volume of liquid and becoming vented to atmosphere as a waste gas stream. It is known that surfactants affect the dissolution of oxygen in water. For example, a paper entitled "Oxygen Transfer in Activated Sludge Basins of Sewage Treatment Plants", by H. H. Daucher, Ger. Chem. Eng., 1, (1978), pp 282–289, teaches that the oxygen transfer coefficient decreases in the presence of surfactants in jet aeration apparatus. Surprisingly, however, we have now found that selected surfactants can dramatically enhance gas dissolution in aqueous liquid.

SUMMARY OF THE INVENTION

Accordingly, the present invention provides a method of dispersing and/or dissolving a gas in a volume of aqueous liquid comprising the steps of: forming a multiplicity of discrete bubbles of the gas in a stream of the liquid and introducing the stream into said volume so as to disperse and/or dissolve the gas in said volume; and introducing a quantity of surfactant into the liquid thereby inhibiting coalescence of said gas bubbles, wherein the surfactant comprises: at least one non-ionic surfactant comprising an ethoxylated, branched-chain, alkyl alcohol or alkyl-substituted phenol wherein the alkyl group contains from 8 to 18 carbon atoms, said non-ionic surfactant having a hydrophile/lipophile balance (HLB) in the range of from 8 to 20; at least one anionic surfactant derivative of the said non-ionic surfactant, or a mixture of said nonionic and anionic surfactants.

BRIEF DESCRIPTION OF THE DRAWINGS

FIGS. 3 and 4 are graphs illustrating the effect of different surfactants on the dissolution efficiency of oxygen in an activated sludge.

FIGS. 1 and 2 are not to scale.

DETAILED DESCRIPTION OF THE INVENTION

Figure 1:
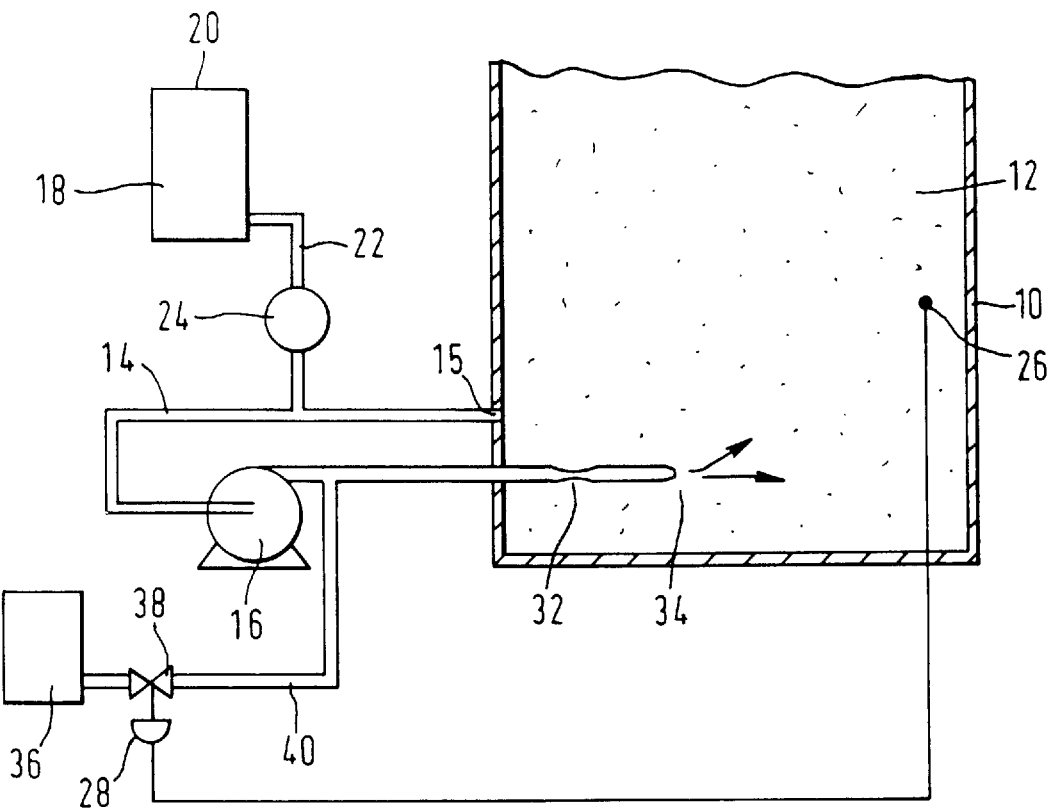
FIG. 1 is a diagrammatic cross-sectional view of a first apparatus suitable for oxygenating a volume of liquid in accordance with the invention.

In general, surfactants have two effects on gas dissolution. First, they inhibit interfacial mass transfer across the surface of a bubble. This effect acts to reduce mass transfer and, therefore, the efficiency with which gas can be dissolved. Second, they inhibit coalescence of small gas bubbles. Since coalescence reduces gas dissolution efficiency, the effect thereof is to increase dissolution. Accordingly, the two effects are in competition to decrease and increase gas dissolution efficiency, respectively. The surfactants chosen for use in the present invention are believed to favor the second effect relative to the first.

Preferably, the non-ionic surfactant utilized in the method of the invention has a hydrophile/lipophile balance in the range of 10 to 15, more preferably 11 to 14. The non-ionic surfactant preferably contains from 3 to 20 ethoxy groups, more preferably from 3 to 10. The alcohol is preferably monohydric. The monohydric alkyl alcohol may be a primary, secondary or tertiary alcohol. Preferably from 50 to 75% by weight of the non-ionic surfactant is contributed by ethoxy groups. Regardless of whether the non-ionic surfactant is an ether of an alcohol or a phenol, its alkyl group preferably has a plurality of branches from its main chain. Each branch is preferably a methyl group.

The anionic surfactants utilized in the present invention are derived from the above-described non-ionic surfactants by forming the sulfate, sulfonate, chlorosulfonate, carboxylate and the like by techniques well known to those skilled in the art. Of these derivatives, the sulfate and sulfonate are generally preferred.

The optimum surfactant for use in assisting the dispersion or dissolution of a gas in an aqueous liquid depends on a number of different factors including the pH content of the liquid, its content of fats, oils and grease, its hardness and the concentration of organic solids, for example activated sludge therein. Accordingly, no single surfactant will be the optimum choice for all conditions. For example, if a non-ionic surfactant is employed, the greater the hardness of the water, the greater the number of units of ethylene oxide that is needed in each molecule of the surfactant for maximum gas dissolution efficiency. In another example, the lower the pH of the aqueous liquid, the smaller is the number of ethylene oxide units in each molecule of the surfactant for achievement of optimum results. In a yet further example, the higher the content of fats, oils and grease in the aqueous liquid to be treated, the greater the value of the hydrophile/lipophile balance of the non-ionic surfactant for achievement of maximum gas dissolving efficiency. Preferably the surfactant is added to the liquid in a concentration from about 10 to 30 ppm by weight, and more preferably from about 10 to 20 ppm by weight.

A method according to the invention may be used to dissolve air, oxygen-enriched air or substantially pure oxygen into a volume of liquid. Alternatively, it may for example be used to introduce a stripping gas into a liquid so as to strip the liquid of dissolved gas. Depending on the gas to be stripped, the stripping gas may be air, oxygen-enriched air, nitrogen, argon, oxygen, or carbon dioxide. The method according to the invention is particularly suited for the treatment of aqueous liquids, for example sewage or other form of waste water having an aqueous biochemical oxygen demand, for example an activated sludge effluent from a sewage or industrial effluent treatment process.

A method according to the invention is particularly suited for use when oxygenating a liquid in accordance with the method disclosed in GB-A-1 455 567. In such a method, the gas is introduced into a region of turbulence in said stream, so as to form the bubbles, the stream flows under pressure, and is introduced into the volume of liquid through a nozzle such that shear forces are caused to act on the bubbles. The shear forces thereby tend to reduce further the size of the bubbles, a multitude of which are carried by the stream to the nozzle. The stream is typically taken from the volume of liquid itself. Such a method is an example of a so-called jet dissolution method, and the invention is believed to be efficacious in all jet dissolution methods. The surfactant may be introduced directly into the volume of liquid to be oxygenated or via a stream of the liquid.

Referring to FIG. 1, a tank 10 for storing a volume 12 of liquid to be treated is provided with a sidestream apparatus for the introduction of gas including a pipeline 14 which at one end 15 terminates in an outlet from tank 10 and which at its other end terminates in a nozzle 34 located within the tank 10. A supply of surfactant 18 is stored in storage vessel 20 which communicates via a pipe 22 with a region of the pipeline 14 upstream of the pump 16. A variable speed dosing pump 24 is located in the pipe 22. The apparatus will be described with regard to an oxygenation of the liquid to be treated.

Downstream of the pump 16, the pipeline 14 is able to be placed in communication with a source 36 of oxygen under pressure by opening a valve 38 in a pipe 40. In operation, the pump 16 raises the pressure of the side stream flowing through the pipe 14 and creates a pressurized turbulent flow immediately downstream thereof. The oxygen is introduced into the turbulent flow and is thereby broken up into bubbles. Sufficient oxygen is supplied such that the side stream carries a multitude of finely divided oxygen bubbles. The side stream containing the oxygen bubbles and the surfactant flows to the nozzle 34 passing through a venturi 32. Also, if desired, the oxygen flow may alternatively be supplied to the throat of the venturi 32. If desired, the venturi 32 may be located proximate the outlet of the pump 16.

The pressurized stream of aqueous liquid containing surfactant, dissolved oxygen and bubbles of undissolved oxygen enters the volume 12 of aqueous liquid through the nozzle 34 which is effective to apply shear forces to the bubbles such that they are caused to divide, thereby becoming even smaller in size. There is normally an appreciable depth of liquid in the tank 10. On the one hand, there is a tendency for the finely divided bubbles to dissolve. On the other hand, there is a tendency for these bubbles to coalesce. Coalescence is undesirable because it makes the bubbles more difficult to dissolve and increases the proportion of the gas which rises to the surface of the liquid and enters the atmosphere thereabove without being dissolved.

The valve 38 is operatively associated via a valve controller 28 with a dissolved oxygen sensor 26 located at a chosen position within the volume 12. The valve controller may be programmed to maintain the dissolved oxygen concentration in the valve 12 at a chosen level or between chosen limits. Thus, the valve 38 may open whenever the dissolved oxygen concentration falls to a minimum, thereby reinitiating oxygenation of the side stream and close whenever the dissolved oxygen concentration in the volume 12 reaches a chosen maximum thereby stopping the oxygenation. At the same time as oxygenation is reinitiated, the dosing pump 24 may be actuated; and at the same time as oxygenation is stopped the pump 24 may be turned off.

Figure 2:
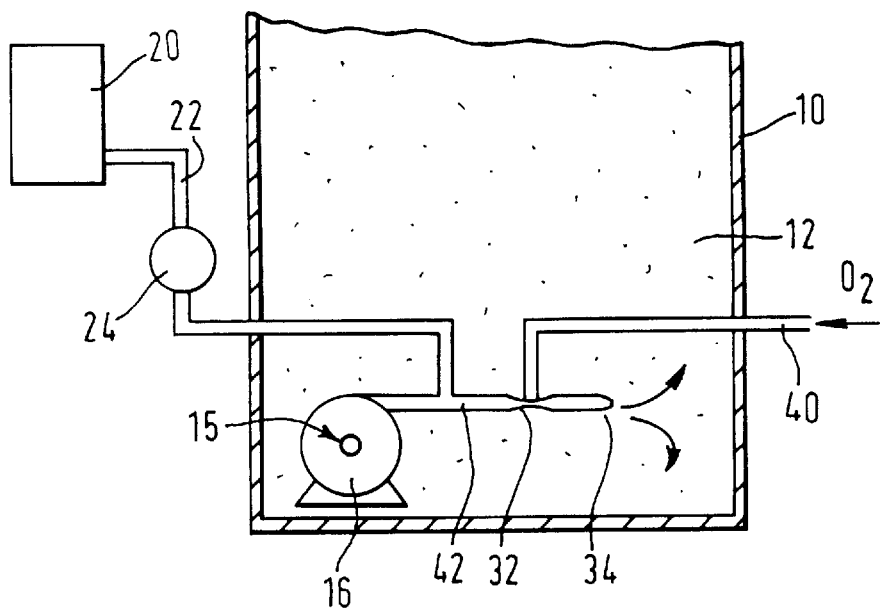
FIG. 2 is a schematic cross-sectional view of a second apparatus suitable for dissolving oxygen in a volume of liquid.

The apparatus shown in FIG. 2 is largely similar to that shown in FIG. 1 and like parts in the two FIGs. are identified by the same reference numbers. In the arrangement shown in FIG. 2, the pipeline 14 is omitted and the pump 16 is submerged in the volume 12 of liquid in the tank 10. The pump 16 has an inlet 15 for liquid and an outlet pipeline 42. The arrangement for adding surfactant to the side stream in the apparatus shown in FIG. 2 is generally similar to that shown in FIG. 1 except that the surfactant is added downstream of the outlet to the pump 16 but upstream of the venturi 32.

In order to enable the surfactant to be added upstream of the addition of oxygen, the pipe 40 communicates with the throat of the venturi 32. It is useful to add the surfactant upstream of the oxygen since, although the main benefit of the surfactant is in preventing coalescence of the bubbles within the tank 10, it has a similar effect in inhibiting coalescence of the oxygen bubbles downstream of the venturi 32 and upstream of the nozzle 34.

If desired, the surfactant may be added to the volume of water, or aqueous waste material having a biochemical oxygen demand directly and not via a side stream of the water to be treated.

The invention is further described in the following example which is given to further illustrate the invention and is in no way intended to be limiting thereon.

EXAMPLE

A volume of industrial activated sludge containing 5000 mg/l of suspended organic solids was oxygenated employing an apparatus essentially similar to those shown in FIGS. 1 and 2. The sludge had a pH of 6.5, a content of fats, oil and grease of between 5 and 10 ppm, and a calcium carbonate hardness of 400 ppm by weight. Experiments were conducted with different surfactants in order to assess their effect on oxygen dissolution efficiency (by which is meant the proportion of the oxygen which is dissolved or otherwise consumed in the liquid). Experiments were performed at different levels of surfactant up to 60 ppm by weight. The following surfactants were employed:

1. Different ethoxy ethers of a monohydric branched-chain alkyl alcohol containing from 8 to 18 carbon atoms, the ether containing (a) 56%, (b) 62.5%, (c) 66.5%, (d) 68% and (e) 70.5% by weight of ethylene oxide units respectively and having HLBs of 11.2, 12.5, 13.3, 13.6 and 14.1, respectively.

2. A sodium sulfate derivative of an ethoxy ether of a branched-chain $C_8$ to $C_{18}$ alkyl phenol containing about 52.5% by weight of ethylene oxide units, the HLB of the non-sulfated ethoxy ether alkyl phenol being about 10.5.

Figure 3:
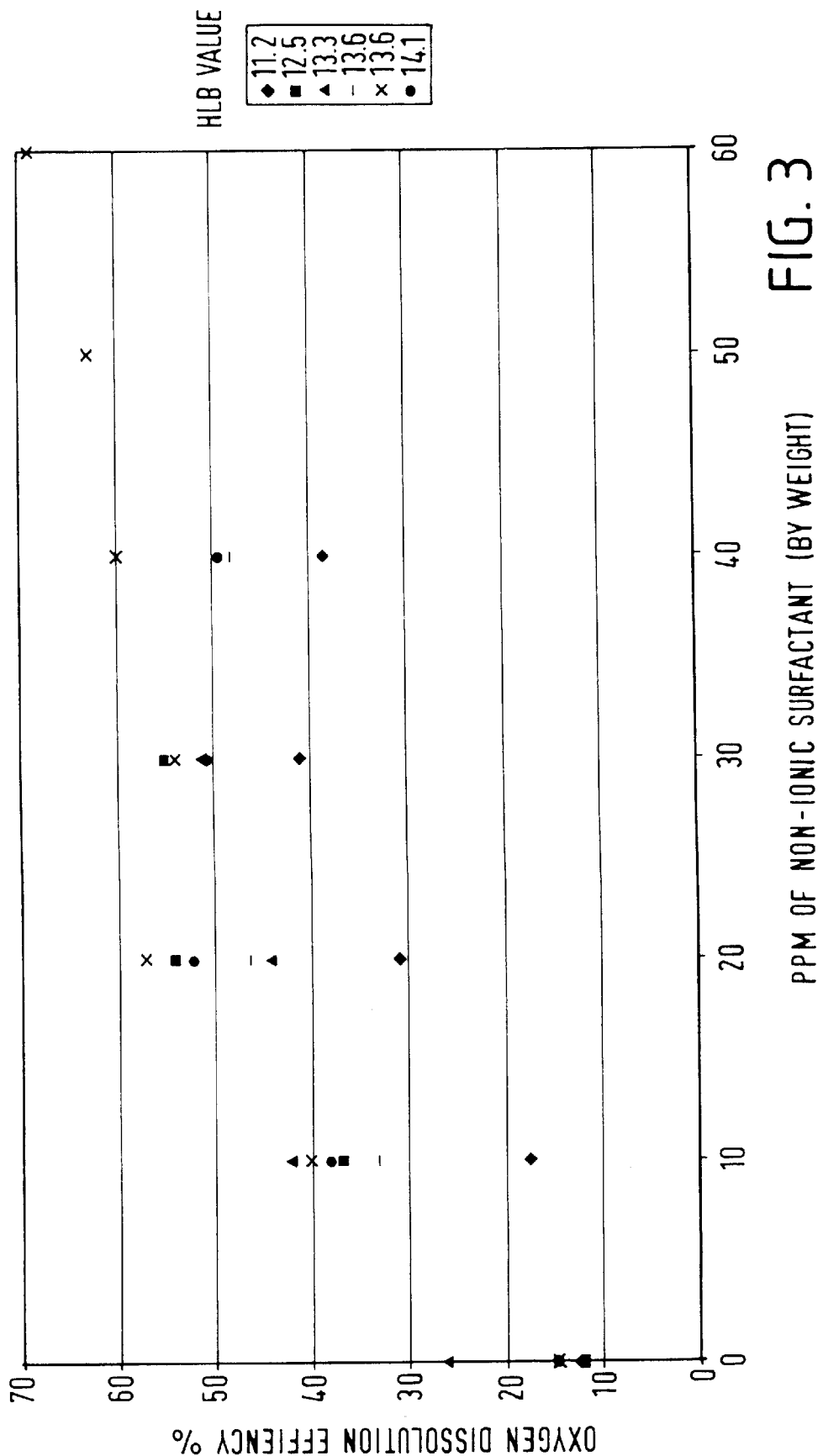

The results of the experiments 1(a) to 1(e) are set out in FIG. 3. It can be seen that even a concentration of surfactant as low as 10 ppm gives an appreciable enhancement of oxygen dissolution efficiency. At 30 ppm the enhancement in most of the examples is more than twofold. Above about 30 ppm surfactant, however, the rate of increase of oxygen dissolution efficiency becomes less marked, and eventually a maximum efficiency will be reached.

The results of experiment 2 is set out in FIG. 4 which is a graph of relative oxygen dissolution efficiency plotted against surfactant concentration. A substantial increase in relative oxygen dissolution efficiency is achieved at 30 ppm by weight of the surfactant. The results show, however, that at higher concentrations of this surfactant there is little if any increase in relative oxygen dissolution efficiency. The surfactant investigated in experiment 2 has a less dramatic (although still very marked) effect on the relative oxygen dissolution efficiency than those investigated in experiments 1(a) to 1(e).

Various comparative experiments were also performed which show that firstly relatively minor changes to the chosen surfactants can substantially reduce their effectiveness in increasing relative oxygen dissolution efficiency and that other kinds of surfactant can have a detrimental effect on relative oxygen dissolution efficiency. Thus, it was observed:

(a) that a sodium sulfate derivative of a first non-ionic surfactant in the form of an ethoxylated, straight-chained, $C_8$–$C_{18}$ alkyl alcohol, the non-ionic surfactant having an HLB of 8.3, gave a maximum relative oxygen dissolution efficiency of only about 1.43;

(b) a sodium sulfate derivative of a second non-ionic surfactant in the form of an ethoxylated, straight-chained, $C_8$–$C_{18}$ alkyl alcohol, the non-ionic surfactant having an HLB of 10, gave a maximum relative oxygen dissolution efficiency of only about 1.15;

(c) an anionic surfactant in the form of an amine salt of an alkyl benzene sulfonic acid gave relative oxygen dissolution efficiencies in the range of 0.95 to 1.0, i.e. it effected a small reduction in the relative oxygen dissolution, and (d) anionic surfactant in the form of sodium sulfosuccinate actually reduced the relative oxygen dissolution efficiency to between 0.75 and 0.80.

I claim:

1. In a method of dispersing or dissolving a gas in a volume of aqueous liquid comprising the steps of forming a multiplicity of discrete bubbles of the gas in a stream of the liquid for dispersion or dissolution therein and introducing the stream into said volume so as to disperse or dissolve the gas in said volume, the improvement comprising introducing a quantity of surfactant into the liquid thereby inhibiting coalescence of said gas bubbles and improving dissolution, said surfactant is selected from the group consisting of at least one non-ionic surfactant comprising an ethyoxylated, branched-chain, alkyl alcohol or alkyl-substituted phenol wherein the alkyl group contains from 8 to 18 carbon atoms, said non-ionic surfactant having a hydrophile/lipophile balance (HLB) of from 8 to 20; at least one anionic surfactant derivative of said non-ionic surfactant; and a mixture of said non-ionic and anionic surfactants.

2. A method in accordance with claim 1, wherein the non-ionic surfactant contains from 3 to 20 ethoxy groups.

3. A method in accordance with claim 2, wherein the non-ionic surfactant contains from 3 to 10 ethoxy groups.

4. A method in accordance with claim 3, wherein the alcohol is a monohydric alkyl alcohol having from 8 to 18 carbon atoms.

5. A method in accordance with claim 4, wherein the alkyl group has a main hydrocarbon chain and at least two branches therefrom.

6. A method in accordance with claim 5, wherein each branch is a methyl group.

7. A method in accordance with claim 1, wherein the said alkyl substituent has a main hydrocarbon chain and at least two branches therefrom.

8. A method in accordance with claim 7, wherein each branch is a methyl group.

9. A method in accordance with claim 1, wherein the non-ionic surfactant has a hydrophile/lipophile balance in the range of from 10 to 15.

10. A method in accordance with claim 9, wherein the hydrophile/lipophile balance is in the range of from 11 to 14.

11. A method in accordance with claim 1, wherein the anionic surfactant is a sulfate or sulfonate derivative of the non-ionic surfactant.

12. A method in accordance with claim 1, wherein the aqueous liquid has a biochemical oxygen demand.

13. A method in accordance with claim 12, wherein the liquid to be treated comprises an activated sludge.

14. A method in accordance with claim 1, wherein the quantity of surfactant added to the liquid is sufficient to provide a concentration of surfactant from about 10 to 30 ppm by weight.

15. A method in accordance with claim 14, wherein the quantity of surfactant added to the liquid is sufficient, to provide a concentration of surfactant from about 10 to 20 ppm by weight.

16. A method in accordance with 1, wherein the gas is substantially pure oxygen, oxygen-enriched air or air.

17. A method in accordance with claim 1, wherein the gas is introduced into a region of turbulence in said stream so as to form the bubbles, the stream flows under pressure, and is introduced into the volume of liquid through a nozzle such that shear forces are caused to act on the bubbles.

18. A method in accordance with claim 17, wherein the quantity of surfactant is introduced into the pressurized stream.

19. A method in accordance with claim 18, wherein the quantity of surfactant is introduced into the stream upstream of the gas.

20. A method in accordance with claim 1, wherein the gas is a stripping gas for stripping a dissolved gas from the liquid.

* * * * *